(12) United States Patent
Chieh et al.

(10) Patent No.: US 9,628,162 B1
(45) Date of Patent: Apr. 18, 2017

(54) TECHNIQUES AND METHODS FOR ALIASING DIGITAL BEAMFORMERS FOR REDUCED COMPUTATIONAL LOADS

(71) Applicant: SPAWAR Systems Center Pacific, San Diego, CA (US)

(72) Inventors: Jia-Chi Samuel Chieh, San Diego, CA (US); Michael Civerolo, San Diego, CA (US)

(73) Assignee: The United States of America as represented by Secretary of the Navy, Washington, DC (US)

( * ) Notice: Subject to any disclaimer, the term of this patent is extended or adjusted under 35 U.S.C. 154(b) by 0 days.

(21) Appl. No.: 15/271,958

(22) Filed: Sep. 21, 2016

(51) Int. Cl.
  *H04B 7/06* (2006.01)
  *H04B 1/00* (2006.01)
  *H04B 7/04* (2017.01)

(52) U.S. Cl.
  CPC ......... *H04B 7/0617* (2013.01); *H04B 1/0025* (2013.01); *H04B 7/043* (2013.01)

(58) Field of Classification Search
  CPC ........ H04B 7/0617; H04B 7/08; H04B 7/084; H04B 7/0845; H04B 7/0868; H04B 7/0885; H04B 7/043; H04B 7/0408; H04B 7/0613; H04B 7/0615; H04B 1/0021; H04B 1/0025; H04B 1/0028; H04B 1/0042; H04B 1/0046; H04B 1/006
  USPC ....... 375/259, 260, 267, 295, 299, 316, 347, 375/349
  See application file for complete search history.

(56) References Cited

U.S. PATENT DOCUMENTS

| | | | |
|---|---|---|---|
| 4,170,766 A | 10/1979 | Pridham et al. | |
| 5,461,389 A | 10/1995 | Dean | |
| 5,757,867 A | 5/1998 | Caulfield et al. | |
| 7,474,262 B2 | 1/2009 | Alland | |
| 8,610,514 B2 | 12/2013 | Laudel | |
| 8,731,079 B2 | 5/2014 | Ye | |

(Continued)

FOREIGN PATENT DOCUMENTS

| | | |
|---|---|---|
| EP | 1050759 A2 | 1/2006 |
| WO | WO9506376 A1 | 3/1995 |

OTHER PUBLICATIONS

Harris et al., "Digital receivers and transmitters using polyphase filter banks for wireless communications," Microwave Theory and Techniques, IEEE Transactions on, vol. 51, Apr. 2003.

*Primary Examiner* — Siu Lee
(74) *Attorney, Agent, or Firm* — SPAWAR Systems Center Pacific; Kyle Eppele (57) ABSTRACT

A phased array receiver for use with a first received analog signal and a second received analog signal, the phased array receiver including: a first analog to digital converter to generate a first received digital signal; a second analog to digital converter to generate a second received digital signal; a first down-sampler to generate a first down-sampled digital signal; a second down-sampler to generate a second down-sampled digital signal; a first polyphase low pass filter to generate a first filtered down-sampled received digital signal; a second polyphase low pass filter to generate a second filtered down-sampled received digital signal; and a beamforming core to generate a beamformed signal, wherein the first received signal is related to the first filtered down-sampled received digital signal, and wherein the second received signal is related to the second filtered down-sampled received digital signal.

20 Claims, 10 Drawing Sheets

(56) References Cited

U.S. PATENT DOCUMENTS

2011/0299630 A1* 12/2011 Petrovic ............... H04B 7/0408
375/340
2016/0142922 A1* 5/2016 Chen .................... H04B 7/0695
375/267

* cited by examiner

FIG. 1

PRIOR ART

FIG. 2

PRIOR ART

TECHNIQUES AND METHODS FOR ALIASING DIGITAL BEAMFORMERS FOR REDUCED COMPUTATIONAL LOADS

FEDERALLY-SPONSORED RESEARCH AND DEVELOPMENT

The United States Government has ownership rights in this invention. Licensing inquiries may be directed to the Office of Research and Technical Applications, Space and Naval Warfare Systems Center, Pacific, Code 72120, San Diego, Calif., 92152; telephone (619)553-5118; email: ssc_pac_t2@navy.mil. Reference Navy Case No. 102,726.

BACKGROUND OF THE INVENTION

Embodiments of the invention relate to phased array transmitters and receivers.

SUMMARY OF THE INVENTION

An aspect of the present invention is drawn to a phased array receiver for use with a first received analog signal and a second received analog signal, the phased array receiver including: a first analog to digital converter to generate a first received digital signal based on the first received analog signal; a second analog to digital converter to generate a second received digital signal; a first down-sampler to generate a first down-sampled digital signal based on the first received digital signal; a second down-sampler to generate a second down-sampled digital signal based on the second received digital signal; a first polyphase low pass filter to generate a first filtered down-sampled received digital signal based on the first down-sampled digital signal; a second polyphase low pass filter to generate a second filtered down-sampled received digital signal based on the second down-sampled digital signal; and a beamforming core to generate a beamformed signal based on a combination of a first received signal and a second received signal, wherein the first received signal is related to the first filtered down-sampled received digital signal, and wherein the second received signal is related to the second filtered down-sampled received digital signal.

BRIEF DESCRIPTION OF THE DRAWINGS

The accompanying drawings, which are incorporated in and form a part of the specification, illustrate example embodiments and, together with the description, serve to explain the principles of the invention. In the drawings.

DETAILED DESCRIPTION OF THE EMBODIMENTS

The purpose of this invention is to reduce the computational load that the DSP must handle for digital beamforming applications. Phased array beamforming antennas are desirable because the antenna beam can be steered electronically instead of mechanically. This results in an antenna beam that can be directed with extreme agility. Phased array antennas (PAA) can be implemented either in the analog/RF domain or in the digital domain. In the analog/RF implementation, phase-shifters or time-delay elements are used to introduce an incremental phase offset for each channel of the PAA. Although it has been demonstrated that this is a feasible method and integrated solutions can be implemented, the complexity of the analog/RF circuitry is high. Microwave modeling of the phase-shifter, frequency modulators/de-modulators and amplifiers are critical to the performance of the PAA. Obtaining high performance in the analog/RF signals not an easy task. For this reason, digital methods are preferred. In this instance, the analog/RF signal is down-converted into an intermediate frequency (IF) as quickly as possible. Once the signal has been converted to a lower frequency IF, a data converter can be used to convert the analog/RF signal to a digital signal. Once in the digital domain, digital signal processing can be used to perform beam-steering. Digital Beamforming (DBF) is preferred because very little manipulation or processing of the analog RF is performed, and so the integrity of the signal is maintained.

However, this means that post-processing in the digital domain must occur in order to manipulate the signals in order to steer the beam. Reducing the computational load that the DSP processor must handle can decrease the power consumption and increase the number of beamforming cores that can reside in a constrained area. This allows additional functionality and maximizes efficiency. Aspects of the present invention utilize an IF-sampling (bandpass sampling) aliasing digital receiver architecture for digital beamforming applications which lowers the computational load on the DSP.

Rather than introduce the progressive phase shift in the analog/RF domain, for which performance is often difficult to obtain, phase shifts can be introduced in the digital domain by the multiplication of the appropriate weights. In order to achieve this, the analog/RF signal must first be down-converted to an IF or a low-IF. The reason why this is necessary is that analog-to-digital converters (ADC) have limited sampling rates, and often times cannot sample up to the RF/microwave frequency regime. Once the signals are down-converted to a low-IF, they are converted to a digital representation and a DSP algorithm is utilized to form the beams. DBF relies on the fact that each channel can be distinguished from each other. This will be described with reference to FIG. 1

Figure 1:
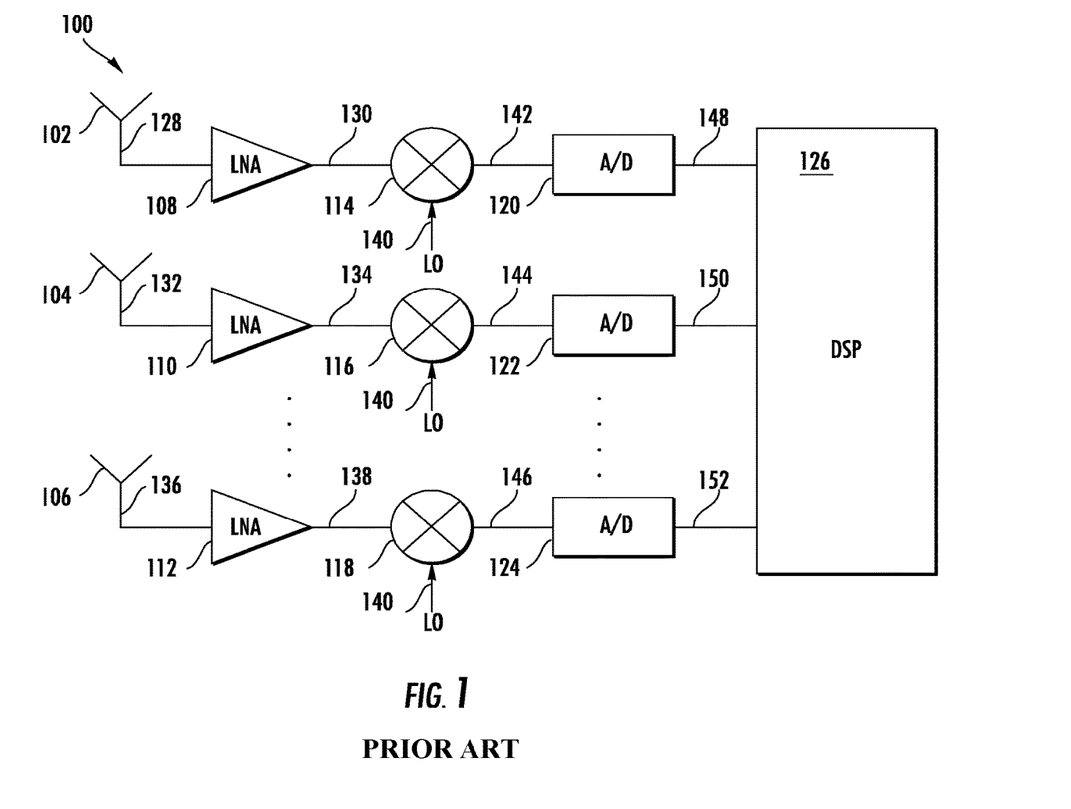
FIG. 1 illustrates a prior art digital beamforming (DBF) receiver architecture.

FIG. 1 illustrates a prior art DBF receiver architecture 100.

As illustrated in the figure, prior art DBF architecture 100 includes: N antenna elements, a sample of which are indicated as an antenna element 102, an antenna element 104 and an $N^{th}$ antenna element 106; N low noise amplifiers (LNAs), a sample of which are indicated as a LNA 108, a LNA 110 and an $N^{th}$ LNA 112; N mixers, a sample of which are indicated as a mixer 114, a mixer 116 and an $N^{th}$ mixer 118; N analog-to-digital converters (ADCs), a sample of which are indicated as an ADC 120, an ADC 122 and an $N^{th}$ ADC 124; and a DSP 126.

It should be noted that N can be any number greater than one. The following discussion will describe N being three, but clearly more may be implemented as indicated by the continuing dots in the figure.

LNA 108 is arranged to receive an analog antenna signal 128 from antenna element 102 and output an amplified analog signal 130. LNA 110 is arranged to receive an analog antenna signal 132 from antenna element 104 and output an amplified analog signal 134. LNA 112 is arranged to receive an analog antenna signal 136 from antenna element 106 and output an amplified analog signal 138.

Mixer 114 is arranged to receive amplified analog signal 130 and a local analog oscillator signal 140. Mixer 114 is further arranged to output a received mixed analog signal 142. Mixer 116 is arranged to receive amplified analog signal 134 and local analog oscillator signal 140. Mixer 116 is further arranged to output a received mixed analog signal 144. Mixer 118 is arranged to receive amplified analog signal 138 and local analog oscillator signal 140. Mixer 118 is further arranged to output a received mixed analog signal 146.

ADC 120 is arranged to receive received mixed analog signal 142 and to output a received digital signal 148. ADC 122 is arranged to receive received mixed analog signal 144 and to output a received digital signal 150. ADC 124 is arranged to receive received mixed analog signal 146 and to output a received digital signal 152.

DSP 126 is arranged to receive received digital signal 148, received digital signal 150 and received digital signal 152.

Antenna element 102, antenna element 104 and antenna element 106 are elements of a PAA operable to receive and transmit an RF signal. LNA 108, LNA 110 and LNA 112 are operable to amplify received analog antenna signals without significantly degrading the signal to noise ratio. Mixer 114, mixer 116 and mixer 118 are three-port analog devices operable to modulate an RF analog signal with the application of a local oscillator at the LO port. ADC 120, ADC 122 and ADC 124 are any low-power, high speed, high resolution analog to digital conversion device suitable for beamforming applications. DSP 126 is a device or system of devices operable to accept multiple digital channel inputs in order to digitally perform beamforming processes such as, but not limited to, phase shifting and amplitude scaling of each channel and summation of all channels. Non-limiting examples may be general purpose DSP chips or dedicated beamforming chips.

In this embodiment, LNA 108 amplifies analog antenna signal 128 and outputs amplified analog signal 130. Amplified analog signal 130 is then modulated by multiplication with local analog oscillator signal 140 at mixer 114 and outputs received mixed analog signal 142. Similarly, LNA 110 amplifies analog antenna signal 132 and outputs amplified analog signal 134. Amplified analog signal 134 is then modulated by multiplication with local analog oscillator signal 140 at mixer 116 and outputs received mixed analog signal 144. Further, LNA 112 amplifies analog antenna signal 136 and outputs amplified analog signal 138. Amplified analog signal 138 is then modulated by multiplication with local analog oscillator signal 140 at mixer 118 and outputs received mixed analog signal 146.

Amplified analog signal 130, amplified analog signal 134 and amplified analog signal 138 are RF signals that must be down-converted to a low-IF because analog to digital converters often cannot sample at a sufficient rate to represent RF/microwave frequencies. In this example, all channels are down-converted to an identical low-IF. To accomplish this, amplified analog signal 130 is multiplied at mixer 114 by local analog oscillator signal 140, amplified analog signal 134 is multiplied at mixer 116 by local analog oscillator signal 140 and amplified analog signal 138 is multiplied at mixer 118 by local analog oscillator signal 140. Received mixed analog signal 142, received mixed analog signal 144 and received mixed analog signal 146 are then ready to be digitized.

Since each channel is now at the same low-IF, a separate A/D is required for each channel. ADC 120 creates a digital representation of received mixed analog signal 142 and outputs received digital signal 148. ADC 122 creates a digital representation of received mixed analog signal 144 and outputs received digital signal 150. ADC 124 creates a digital representation of received mixed analog signal 146 and outputs received digital signal 152. Received digital signal 148, received digital signal 150 and received digital signal 152 are then all sent to DSP 126 for processing.

Prior art DBF architecture 100 uses a separate analog to digital converter for each channel and inputs a digital signal from each channel to a DSP processor.

Once a signal has been converted to the digital domain, for example received digital signal 148, it needs to be conditioned so that either a phase shift or a time-delay is applied. In order to condition the signal, the signal needs to be brought down to "baseband" because digital circuits dissipate power proportionally to its operating frequency. This is shown in equation (1) as follows:

$$\text{Power Dissipated}_{dynamic} = \frac{1}{2} CV^2 f_{operation} \quad (1)$$

where C is the capacitance of the circuit, V is the voltage across the circuit and $f_{operation}$ is the operation frequency of the circuit.

It is therefore important to bring the frequency of operation, or the sampling frequency, down in order to minimize the dissipated power. When using a traditional digital receiver architecture, the computations are not optimized. This is because the traditional digital receiver architecture is a replica of the analog function. This will be described with reference to FIG. 2.

Figure 2:
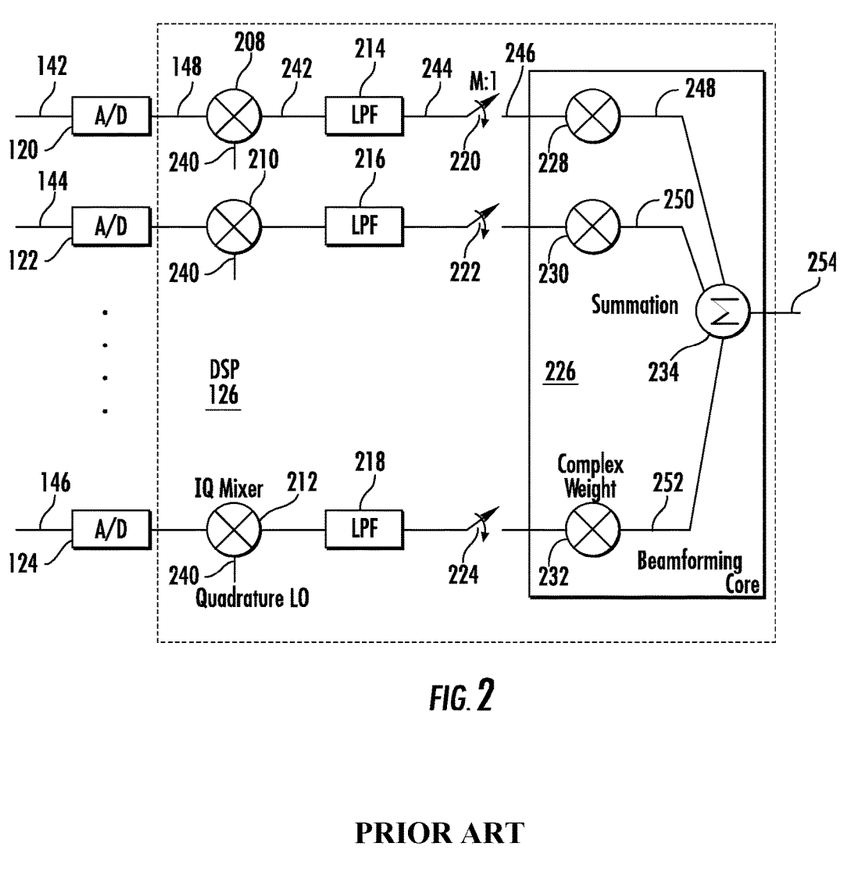
FIG. 2 illustrates a prior art digital receiver with a beamformer digital signal processor (DSP)

FIG. 2 a more detailed view of DSP 126.

As shown in the figure, DSP 126 includes: N IQ mixers, a sample of which are shown as an IQ mixer 208, an IQ mixer 210 and an $N^{th}$ IQ mixer 212; N low pass filters (LPFs), a sample of which are shown as an LPF 214, an LPF 216 and an $N^{th}$ LPF 218; N down-samplers, a sample of which are shown as a down-sampler 220, a down-sampler 222 and an $N^{th}$ down-sampler 224; and a beamforming core 226.

Beamforming core 226 includes: N complex weighting mixers, a sample of which are shown as a complex weighting mixer 228, a complex weighting mixer 230 and an $N^{th}$ complex weighting mixer 232; and an adder 234.

Each "line" of ADC, mixer, LPF, down-sampler and complex weighting mixer may be considered a received signal processing line. For purposes of brevity of discussion, only a single such line will be described, wherein the remaining lines function similarly.

ADC 120 receives received mixed analog signal 142 from mixer 114 (not shown). Many frequencies might be received at an antenna element. However, only a specific frequency (or band of frequencies) are of interest, i.e., transmitted from a corresponding transmitter for receipt by the antenna element. Consider received mixed analog signal 142 in the frequency domain. This will be described with reference to FIG. 3.

Figure 3:
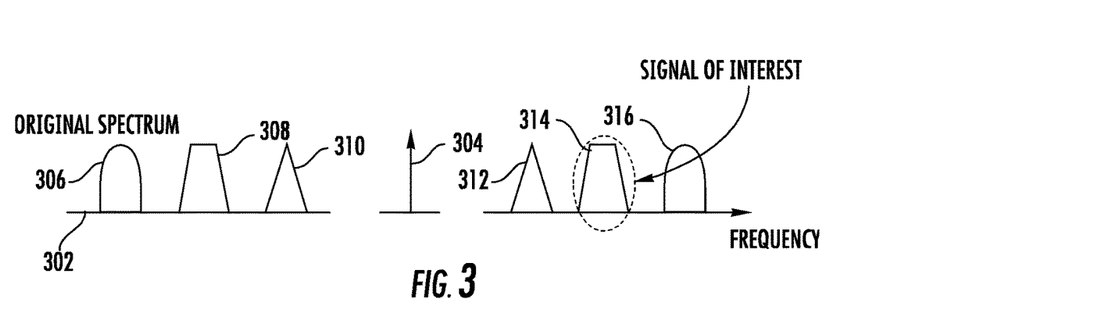
FIG. 3 illustrates an original frequency spectrum depiction of the conventional digital receiver with a beamforming DSP of FIG. 2.

FIG. 3 illustrates an original frequency spectrum depiction of the conventional digital receiver with a beamforming DSP of FIG. 2.

FIG. 3 includes an X-axis 302 corresponding to frequency. An arrow 304 indicates Zero frequency, or a baseband. Shapes 306, 308 and 310 represent signals within the original spectrum having a negative frequency. Shape 306 corresponds to a signal having the highest negative frequency, whereas shape 310 corresponds to a signal having the lowest negative frequency, and whereas shape 308 corresponds to a signal having an intermediate negative frequency. Shapes 312, 314 and 316 represent signals within the original spectrum having a positive frequency. Shape 316 corresponds to a signal having the highest frequency, whereas shape 312 corresponds to a signal having the lowest frequency, and whereas shape 314 corresponds to a signal having an intermediate frequency.

A Fourier transform breaks up a signal into complex exponentials, which can be thought of as spirals, spinning around in the complex plane. Such spirals can either be left-handed or right-handed (rotating clockwise or counter-clockwise), which is where the concept of negative frequency is derived. This might also be thought of as the phase angle going forward or backward in time.

In the case of real signals, there are always two equal-amplitude complex exponentials, rotating in opposite directions, so that their real parts combine and imaginary parts cancel out, leaving only a real sinusoid as the result. This is why the spectrum of a sine wave always has two spikes, one positive frequency and one negative frequency. The negative and positive frequency components are both necessary to produce the real signal. If the signal is known to be real, the other side of the spectrum does not provide any extra information, so it is often ignored.

With respect to FIG. 3, the negative frequency of shape 306 corresponds with frequency of shape 316. Similarly, the negative frequency of shape 308 corresponds with frequency of shape 314, whereas the negative frequency of shape 310 corresponds with frequency of shape 312. For purposes of discussion herein, the negative frequencies will be ignored.

For purposes of discussion, suppose that the signal of interest, e.g., received mixed analog signal 142, corresponds to shape 314.

Returning to FIG. 2, IQ mixer 208 is arranged to receive received digital signal 148 from ADC 120 and is additionally arranged to receive a Quadrature LO signal 240 from a Quadrature LO (not shown). IQ mixer 208 mixes received digital signal 148 with Quadrature LO signal 240 to generate a mixed received digital signal 242. IQ mixer 208 down-converts received digital signal 148 to baseband. This will be described with reference to FIG. 4.

Figure 4:
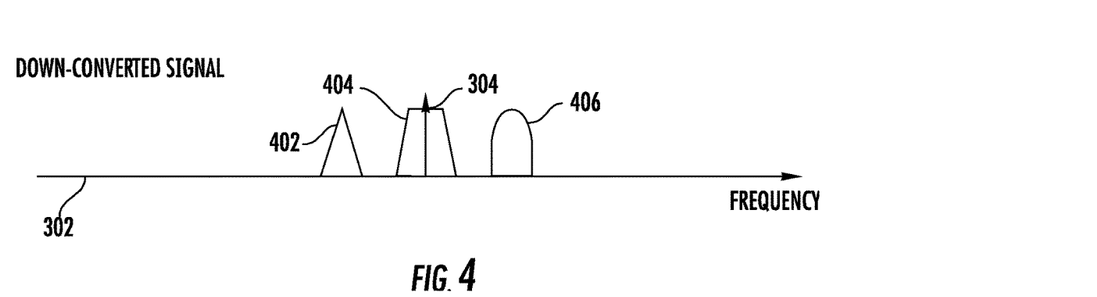
FIG. 4 illustrates a frequency spectrum depiction of the conventional digital receiver with a beamforming DSP of FIG. 2, after down-conversion.

FIG. 4 illustrates a frequency spectrum depiction of DSP 126 DSP of FIG. 2, after down-conversion.

FIG. 4 includes X-axis 302, arrow 304, a shape 402, a shape 404 and a shape 406.

By comparing FIG. 3 with FIG. 4, it is clear that shape 314 has moved to be centered about arrow 304, as shape 404. More specifically, IQ mixer 208 has down-converted the frequency of the signal associated with shape 314 (of FIG. 3) to baseband, thus shifting the position on the frequency spectrum to shape 404 to arrow 304. It should be noted that all frequencies are similarly down-converted. As such, IQ mixer 208 has down-converted the frequency of the signal associated with shape 316 (of FIG. 3) closer to baseband, thus shifting the position on the frequency spectrum to shape 406 to the right of arrow 304, and IQ mixer 208 has down-converted the frequency of the signal associated with shape 312 (of FIG. 3), thus shifting the position on the frequency spectrum to shape 402 to the left of arrow 304.

Returning to FIG. 2, now that IQ mixer has down converted the signal, LPF 214 filters mixed received digital signal 242 to generate a filtered signal 244. In this manner the signal of interest can be isolated. This will be described with reference to FIG. 5.

Figure 5:
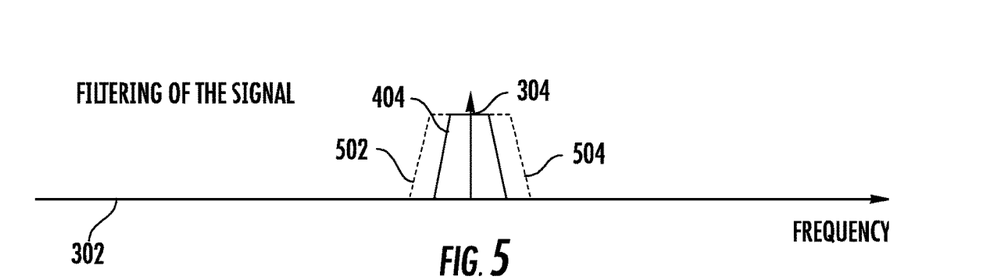
FIG. 5 illustrates a frequency spectrum depiction of the conventional digital receiver with a beamforming DSP of FIG. 2, after filtering.

FIG. 5 illustrates a frequency spectrum depiction of the conventional digital receiver with a beamforming DSP of FIG. 2, after filtering.

FIG. 5 includes X-axis 302, arrow 304, shape 402, a dotted shape 502 and a dotted shape 504.

Dotted shape 502 and dotted shape 504 represent the pass band of LPF 214. In this manner, LPF has isolated the signal of interest corresponding to shape 404 by filtering out the remaining signals corresponding to shapes 402 and 406. By comparing FIG. 4 with FIG. 5, LFP 214 has removed shape 402 and shape 406.

Returning to FIG. 2, down-sampler 220 down-samples filtered signal 244 to output a down-sampled signal 246. This will be described in greater detail with reference to FIGS. 6-7.

Figure 6:
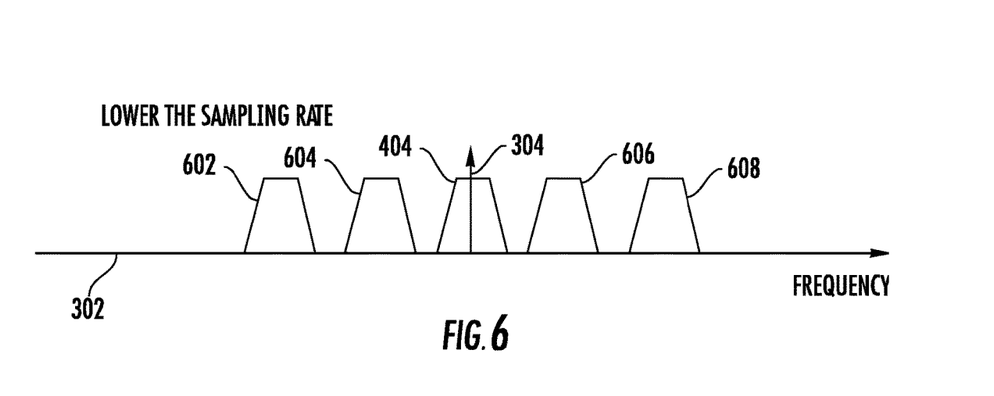
FIG. 6 illustrates a frequency spectrum depiction of the conventional digital receiver with a beamforming DSP of FIG. 2, after lowering the sampling rate.

FIG. 6 illustrates a frequency spectrum depiction of DSP 126 of FIG. 2, after lowering the sampling rate.

FIG. 6 includes X-axis 302, arrow 304, shape 404, a shape 602, a shape 604, a shape 606 and a shape 608. Here, there are many iterations of shape 404 along the frequency spectrum. This is a direct result of aliasing of the down-sampled filtered signal 244 by down-sampler 220.

Figure 7:
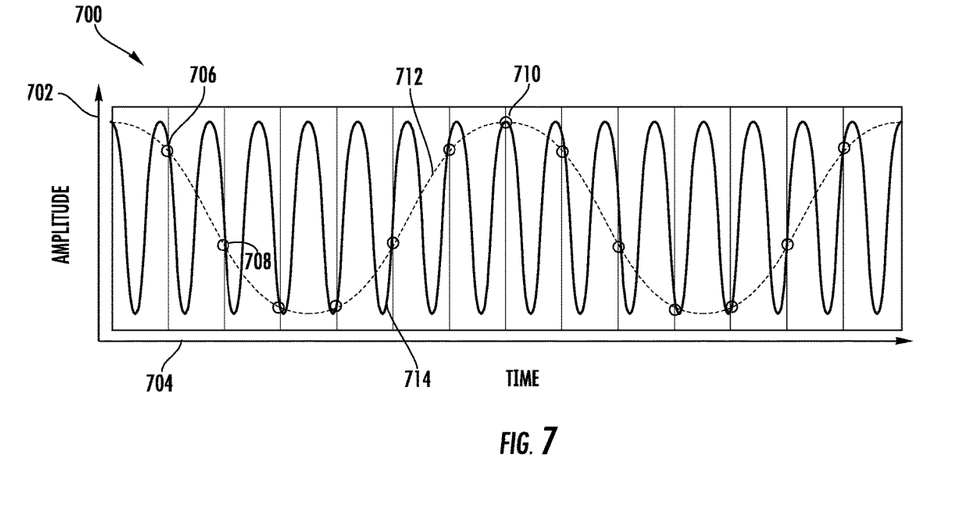
FIG. 7 illustrates a graph to describe aliasing.

FIG. 7 illustrates a graph 700 to describe aliasing.

Graph 700 includes: a Y-axis 702 corresponding to amplitude; an X-axis 704 corresponding to time; a plurality of sampled points, a sample of which are indicated as sampled point 706, sampled point 708 and sampled point 710; a sinusoidal function 712 and a sinusoidal function 714.

For purposes of discussion function 712 corresponds to filtered signal 244 from LPF 214 as shown in FIG. 2. Further, the plurality of sampled points on graph 700 correspond to samples provided by down-sampler 220. Clearly, filtered signal 244 "fits" the plurality of sampled points. However, so will many other functions. For example, function 714 additionally "fits" the plurality of sampled points. For purposes of discussion, let function 714 correspond to a frequency associated with shape 606 of FIG. 6. In such a manner, because of aliasing, down-sampler 220 creates a plurality of possible frequencies as intended received frequencies.

Returning to FIG. 2, complex weighting mixer 228 mixes down-sampled signal 246 with a predetermined weighting factor to output a weighted signal 248.

A similar process occurs for each of the other lines. In this manner, adder 234 adds all the weighted signals, including weighted signal 248, a weighted signal 250 from complex weighting mixer 228 and a weighted signal 252 from complex weighting mixer 232 to generate a beamformed signal 254.

The actual beamforming core is at baseband, however the architecture to get to baseband is an analog replica which is not optimized. As can be seen, DBF receiver architecture 100, requires In-phase and Quadrature (IQ) mixers, for example IQ mixer 208, and a quadrature local oscillator (not shown), which provides Quadrature LO signal 240. Further, the sampling rate at the input of the LPF, for example LPF 214, is the same as the input sampling rate.

In DBF receiver architecture 100, the re-sampling (for example as performed by down-sampler 220) of the baseband signal is done after the frequency down-conversion (for example as performed by quadrature mixer 208) and the low-pass filtering (for example as performed by LPF 214). This effectively means that all the circuitry that is prior to the re-sampling must operate at the higher sampling frequency, increasing computational resources.

Aspects of the present invention provide a more optimized approach, which combines all the operations into a single operation, yielding a reduction in computation. Further, in accordance with the present invention, the sampling rate is lowered at the input of the filter, which also reduces the complexity of the filter.

Optimization for the digital domain is critical in order to reduce the computational load as well as reduce the dissipated power. One method of doing this is to re-order and combine some of the operations. A method in accordance with aspects of the present invention uses an IF sampling polyphase technique. The key to improving efficiency and reduction of hardware complexity in the digital domain is to lower the sampling rate as soon as possible.

Aspects of the present invention use an IF sampling approach in order to combine and simplify some of the operations. The IF sampling approach purposely samples a signal below the Nyquist rate, creating aliasing of the signal. This is contrary to the prior art system discussed above with reference to FIGS. 1-6, where aliasing is a negative phenomenon and has historically been avoided at all costs.

An aspect of the present invention is to beneficially implement aliasing, such that any multiple of the output sampling rate will alias directly to baseband. Effectively, the aliasing phenomenon is used as a frequency translation, while at the same time changing the sampling rate. This is beneficial because it removes the need for IQ mixers and quadrature local-oscillators. In order to reduce the complexity of the low-pass filter, a receiver (or transmitter if the case may be) combines operations and implements a polyphase filter.

This will be described with reference to FIGS. 8-10.

Figure 8:
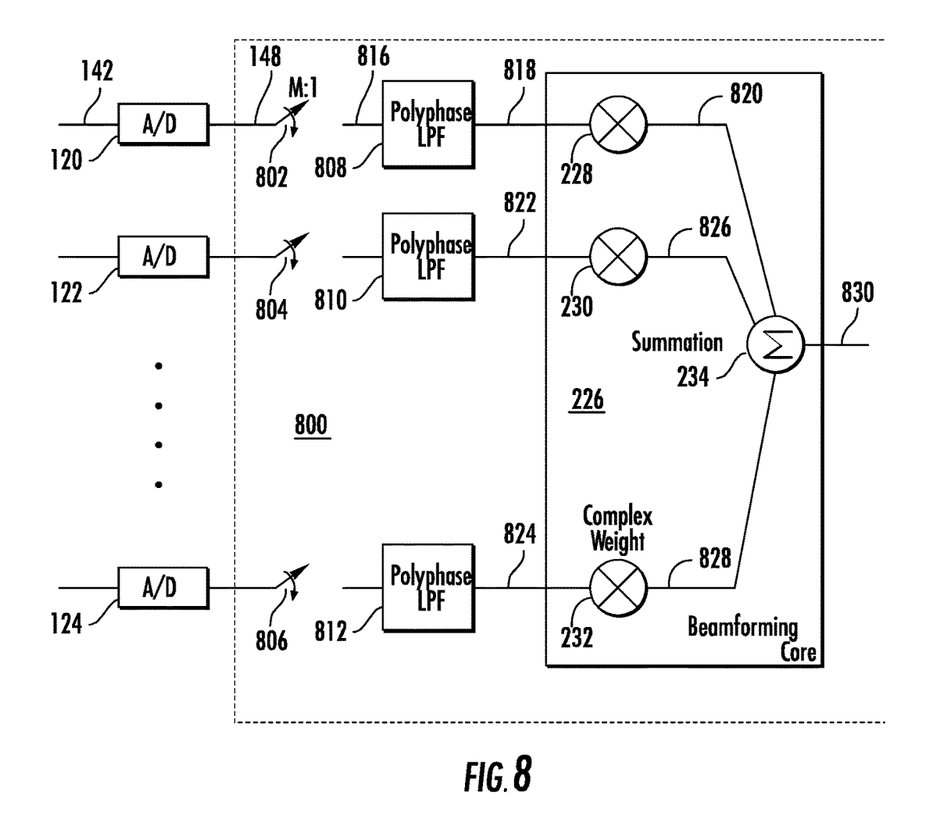
FIG. 8 illustrates an example receiver DSP, in accordance with aspects of the present invention

FIG. 8 illustrates an example receiver DSP 800, in accordance with aspects of the present invention.

As shown in the figure, DSP 800 includes: N down-samplers, a sample of which are shown as a down-sampler 802, a down-sampler 804 and an $N^{th}$ down-sampler 806; N polyphase filters, a sample of which are shown as a polyphase filter 808, a polyphase filter 810 and an $N^{th}$ polyphase filter 812 and beamforming core 226.

Each "line" of down-sampler, polyphase filter and complex weighting mixer may be considered a received signal processing line. For purposes of brevity of discussion, only a single such line will be described, wherein the remaining lines function similarly.

ADC 120 receives received mixed analog signal 142 from mixer 114 (not shown) and outputs received digital signal 148. Down-sampler 802 down-samples received digital signal 148 to output a down-sampled digital signal 816. Polyphase LPF 808 then generates a filtered down-sampled received digital signal 818 based on down-sampled digital signal 816. This will be described in greater detail with reference to FIG. 9.

Figure 9:
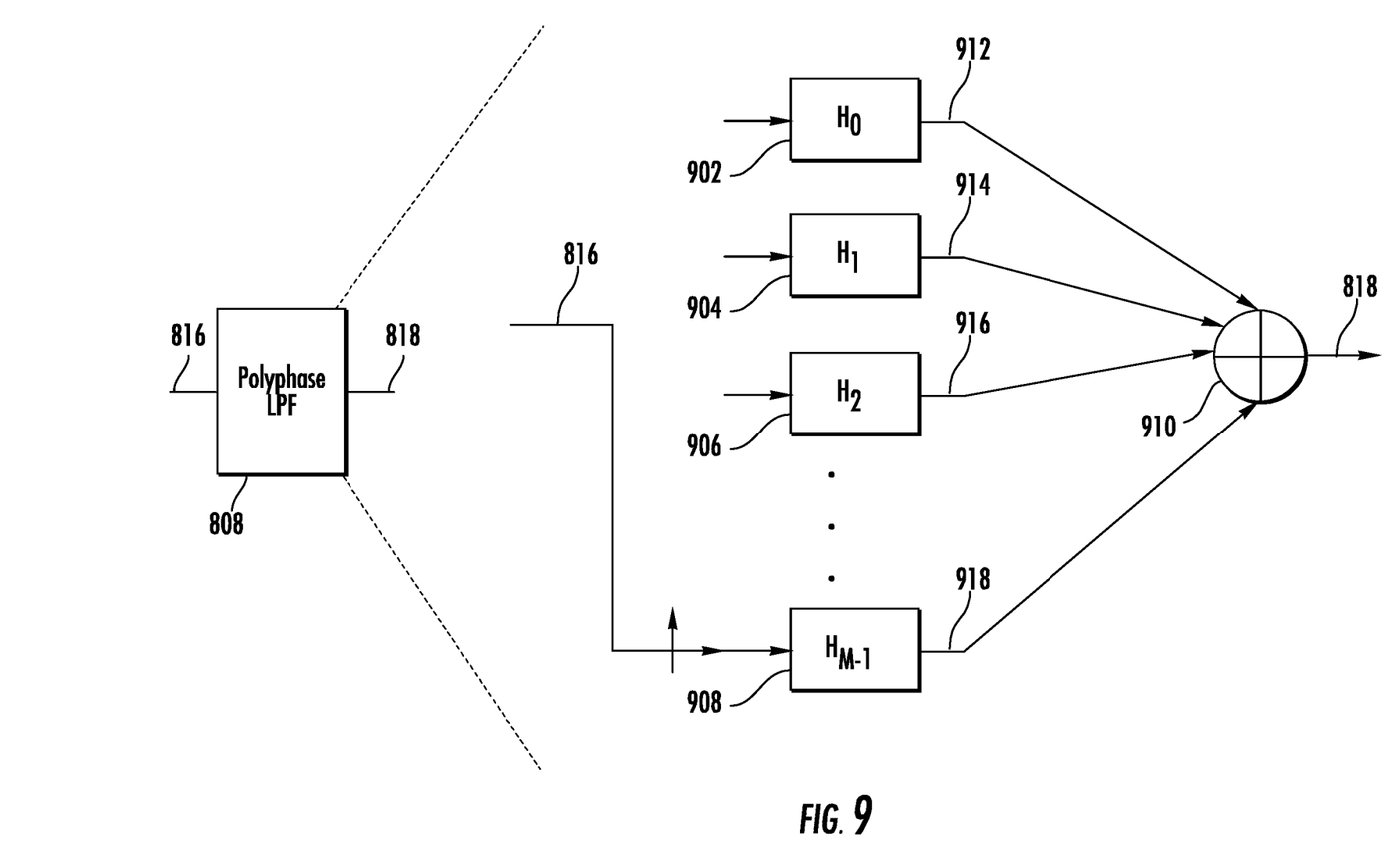
FIG. 9 illustrates an exploded view of polyphaser low pass filter (LPF)

FIG. 9 illustrates an exploded view of polyphase LPF 808.

As shown in the figure, polyphase LPF 808 includes: M filters, a sample of which are shown as a filter 902, a filter 904, a filter 906 and an $M^{th}$ filter 908; and an adder 910. Here, M is an integer greater than 1.

Polyphase LPF 808 is an M-path partitioned filter operable to channelize a combined digital signal by down-sampling at a rate $f_s/M$, where $f_s$ is the sampling rate of the combined signal and M is the number of channels.

Polyphase filter 808 is a filter that is executed in a parallel fashion. Because signal 236 is re-sampled by down-sampler 802 prior to polyphase filter 808, the plurality of parallel filters may be thought of as effectively commutating that input. Because polyphase filter 808 is executed in parallel and 816 is commutated, at any given time, only a single filter is executed. That means that the register size that the filter occupies is greatly reduced. The reduction in register size equates to a reduction in hardware complexity.

Returning to FIG. 8, using the IF sampling approach, down-sampled digital signal 816 is aliased to baseband by re-sampling after down-sampler 802. This removes the need for IQ mixers and quadrature local oscillators. DSP 800 is greatly simplified, as compared to DSP 126 as shown in FIG. 2, by using a polyphase approach, wherein the input is commutated. The ability to combine multiple operations greatly reduces computations resources. This will be described with reference to FIG. 10.

Figure 10:
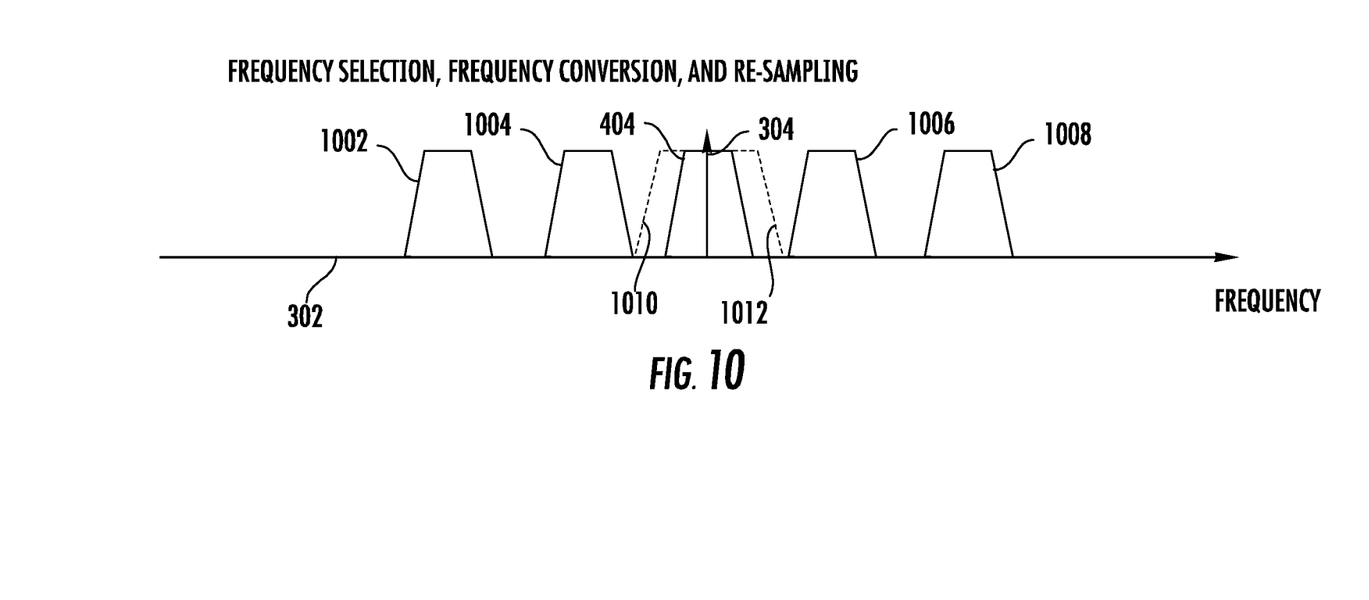
FIG. 10 illustrates a frequency spectrum depiction of a digital receiver with a receiver DSP of FIG. 8, after frequency selection, frequency conversion and re-sampling, in accordance with aspects of the present invention.

FIG. 10 illustrates a frequency spectrum depiction of a digital receiver 800, after frequency selection, frequency conversion and re-sampling, in accordance with aspects of the present invention.

FIG. 10 includes X-axis 302, arrow 304, shape 404, a shape 1002, a shape 1004, a shape 1006, a shape 1008, a dotted shape 1010 and a dotted shape 1012. Here, there are many iterations of shape 404 along the frequency spectrum. This is a direct result of aliasing of the received digital signal 148 by down-sampler 808.

However, polyphase LPF 808 filters out the unwanted signals. In particular, dotted shape 1010 and dotted shape 1012 represent the pass band of polyphaser filter 808. In this manner, polyphaser LPF 808 isolates the signal of interest corresponding to shape 404 by filtering out the remaining signals corresponding to shapes 1002, 1004, 1006 and 1008.

Immediately following polyphase filters 808, 810 and 812, beamforming weights can be applied via beamforming core 226.

The reduction of hardware components along with the combining of operations yields a beamforming core that is more efficient, thereby allowing more cores to fit onto a field programmable gate array or an application specific integrated circuit and ultimately reduces the hardware resources necessary.

If the RF front-end architecture were multiplexed using a scheme such as frequency division multiplexing, code-division multiplexing or time division multiplexing, the polyphase channelizer could be modified to accommodate for this by compensating either with a time delay, a phase delay, or through the use of a channelizer. Further, the complex weights that are shown in FIG. 8 could also be time delay elements in order to realize a beamformer for wideband signals. This is shown in FIG. 11.

Figure 11:
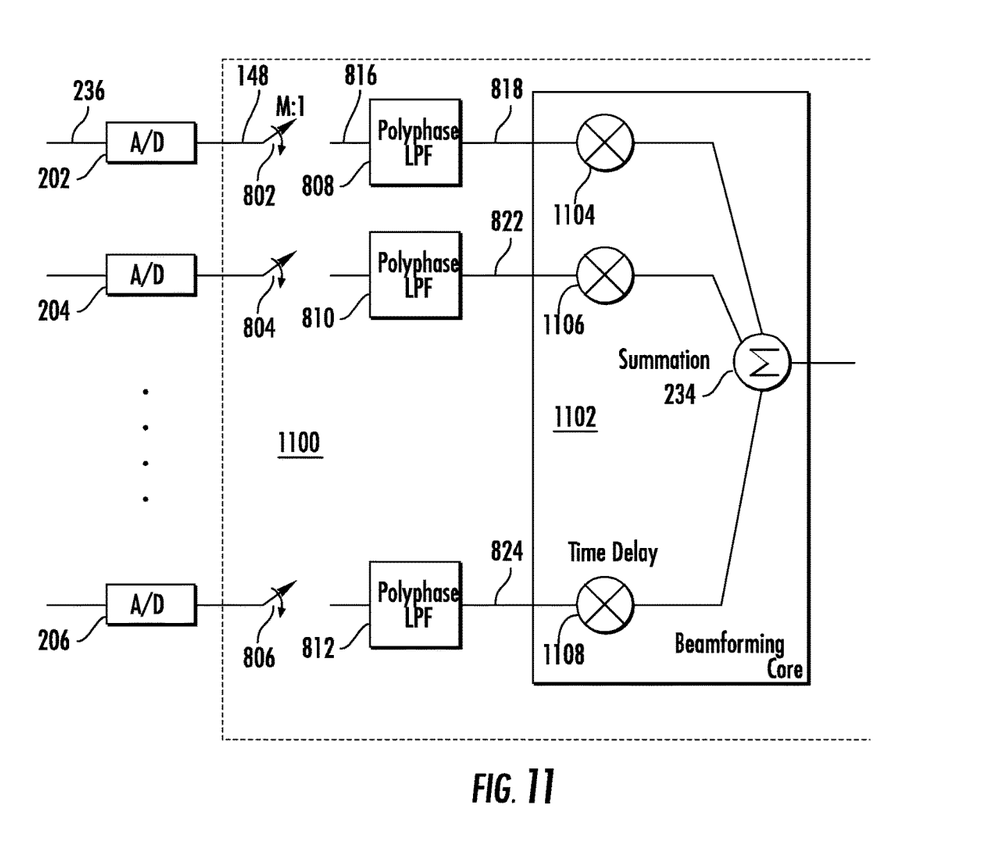
FIG. 11 illustrates another example receiver DSP, in accordance with aspects of the present invention.

FIG. 11 illustrates another example receiver DSP 1100, in accordance with aspects of the present invention.

DSP 1100 is similar to DSP 800 of FIG. 8, with the exception of beamforming core 226 of DSP 800 being replaced with a beamforming core 1102.

Beamforming core 1102 includes: N time delay mixers, a sample of which are shown as a time delay mixer 1104, a time delay mixer 1106 and an $N^{th}$ time delay mixer 1108; and adder 234. Each "line" of ADC, mixer, LPF, down-sampler and time delay mixer may be considered a received signal processing line.

As opposed to adding a complex weight to differentiate each line, in DSP 1100, beamforming core 1102 adds a time delay to differentiate each line.

The non-limiting example complex weighting and time delay embodiments discussed above with reference to FIGS. 8 and 11 are for discussion purposes. It should be noted that any method of differentiating lines may be used.

It should additionally be noted that aspects of the present invention may be applied to a phased array transmitter. In essence, by operating the example embodiments above "in reverse" provides an analogous description for those of skill in the art of a transmitter in accordance with aspects of the present invention. This will briefly be discussed with reference to FIG. 12.

Figure 12:
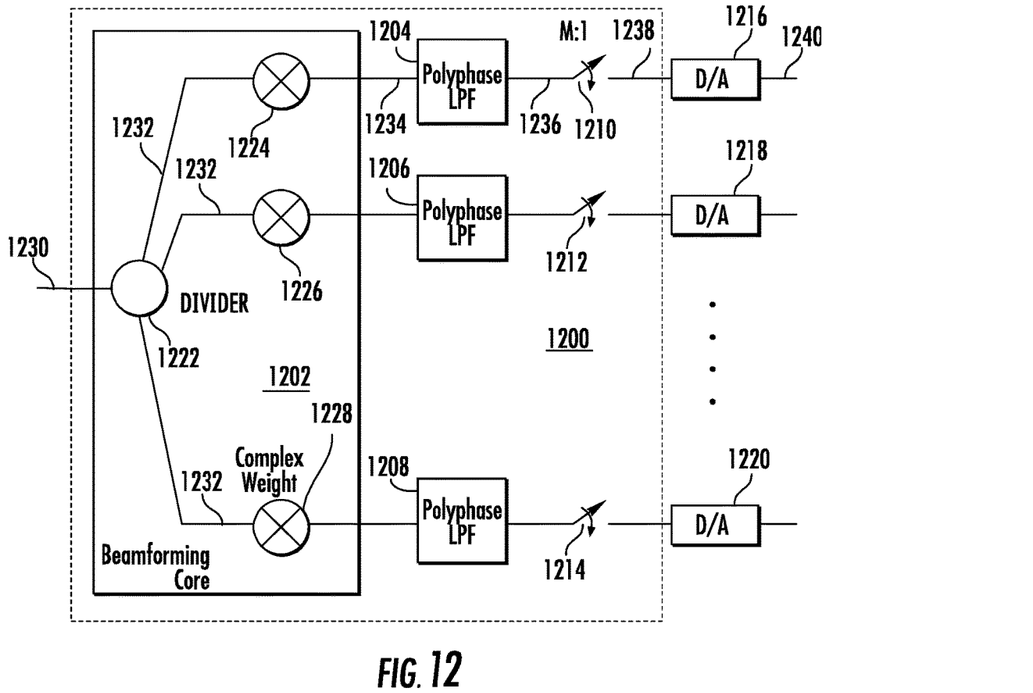
FIG. 12 illustrates an example transmitter DSP, in accordance with aspects of the present invention.

FIG. 12 illustrates an example transmitter DSP 1200, in accordance with aspects of the present invention.

As shown in the figure, DSP 1200 includes: a beamforming core 1202; N polyphase filters, a sample of which are shown as a polyphase filter 1204, a polyphase filter 1206 and an $N^{th}$ polyphase filter 1208; N up-samplers, a sample of which are shown as an up-sampler 1210, an up-sampler 1212 and an $N^{th}$ up-sampler 1214. Further, each up-sampler is connected to a corresponding digital-to-analog converter (DAC), a sample of which are shown as a DAC 1216, a DAC 1218 and an $N^{th}$ DAC 1220.

Beamforming core 1202 includes: a divider 1222, and N complex weighting mixers, a sample of which are shown as a complex weighting mixer 1224, a complex weighting mixer 1226 and an $N^{th}$ complex weighting mixer 1228.

Divider 1222 receives a driving signal 1230 and provides similar signals 1232 to each of complex weighting mixer 1224, a complex weighting mixer 1226 and an $N^{th}$ complex weighting mixer 1228. Each "line" of complex weighting mixer, polyphaser filter and up-sampler may be considered a transmit signal processing line. For purposes of brevity of discussion, only a single such line will be described, wherein the remaining lines function similarly.

Complex weighting mixer 1224 generates a weighted driving signal 1234, which is filtered by polyphase LPF 1204 to create a filtered weighted driving signal 1236. Up-sampler 1210 up-samples filtered weighted driving signal 1236 to generate an up-sampled digital signal 1238. DAC 1216 then generates an analog signal 1240 for transmission from up-sampled digital signal 1238.

A phased array transmitter in accordance with aspects of the present invention will have provide a more optimized approach, which combines all the operations into a single operation, yielding a reduction in computation in a manner analogous to a phased array receiver in accordance with aspects of the present invention.

Further, just as with the complex weights that are shown in FIG. 8 being replaced with delay elements as is shown in FIG. 11, a phased array transmitter in accordance with aspects of the present invention may replace the complex weights that are shown in FIG. 12 with delay elements.

The foregoing description of various preferred embodiments have been presented for purposes of illustration and description. It is not intended to be exhaustive or to limit the invention to the precise forms disclosed, and obviously many modifications and variations are possible in light of the above teaching. The example embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A phased array receiver for use with a first received analog signal and a second received analog signal, said phased array receiver comprising:
    a first analog to digital converter arranged to receive the first received analog signal and to generate a corresponding first received digital signal based on the first received analog signal;
    a second analog to digital converter arranged to receive the second received analog signal and to generate a corresponding second received digital signal;
    a first down-sampler operable to generate a first down-sampled digital signal based on the first received digital signal;
    a second down-sampler operable to generate a second down-sampled digital signal based on the second received digital signal;
    a first polyphase low pass filter operable to generate a first filtered down-sampled received digital signal based on the first down-sampled digital signal;
    a second polyphase low pass filter operable to generate a second filtered down-sampled received digital signal based on the second down-sampled digital signal; and
    a beamforming core operable to generate a beamformed signal based on a combination of a first received signal and a second received signal,
    wherein the first received signal is related to the first filtered down-sampled received digital signal, and
    wherein the second received signal is related to the second filtered down-sampled received digital signal.

2. The phased array receiver of claim 1, wherein said beamforming core comprises an adder operable to generate the beamformed signal based on a summation.

3. The phased array receiver of claim 2, wherein said beamforming core further comprises:
    a first mixer operable to mix the first filtered down-sampled received digital signal and a first factor to generate the first received signal; and
    a second mixer operable to mix the second filtered down-sampled received digital signal and a second factor to generate the second received signal.

4. The phased array receiver of claim 3,
    wherein said first mixer is operable to mix the first filtered down-sampled received digital signal and a first complex weighting factor to generate the first received signal, and
    wherein said second mixer is operable to mix the second filtered down-sampled received digital signal and a second complex weighting factor to generate the second received signal.

5. The phased array receiver of claim 3,
wherein said first mixer is operable to mix the first filtered down-sampled received digital signal and a first time delay factor to generate the first received signal, and
wherein said second mixer is operable to mix the second filtered down-sampled received digital signal and a second time delay factor to generate the second received signal.

6. The phased array receiver of claim 1, wherein said beamforming core further comprises:
a first mixer operable to mix the first filtered down-sampled received digital signal and a first factor to generate the first received signal; and
a second mixer operable to mix the second filtered down-sampled received digital signal and a second factor to generate the second received signal.

7. The phased array receiver of claim 6,
wherein said first mixer is operable to mix the first filtered down-sampled received digital signal and a first complex weighting factor to generate the first received signal, and
wherein said second mixer is operable to mix the second filtered down-sampled received digital signal and a second complex weighting factor to generate the second received signal.

8. The phased array receiver of claim 6,
wherein said first mixer is operable to mix the first filtered down-sampled received digital signal and a first time delay factor to generate the first received signal, and
wherein said second mixer is operable to mix the second filtered down-sampled received digital signal and a second time delay factor to generate the second received signal.

9. A phased array transmitter for use with a driving signal, said phased array transmitter comprising:
a beamforming core operable to generate a first weighted driving signal and a second weighted driving signal based on the driving signal,
a first polyphase low pass filter operable to generate a first filtered weighted driving signal based on the first weighted driving signal;
a second polyphase low pass filter operable to generate a second filtered weighted driving signal based on the second weighted driving signal; and
a first up-sampler operable to generate a first up-sampled digital signal based on the first filtered weighted driving signal;
a second up-sampler operable to generate a second up-sampled digital signal based on the second filtered weighted driving signal;
a first digital to analog converter operable to generate a first analog signal based on the first up-sampled digital signal; and
a second digital to analog converter operable to generate a second analog signal based on the second up-sampled digital signal.

10. The phased array transmitter of claim 9, wherein said beamforming core comprises a divider operable to generate a first driving signal and a second driving signal based on the driving signal.

11. The phased array transmitter of claim 10, wherein said beamforming core further comprises:
a first mixer operable to mix the first driving signal and a first factor to generate the first weighted driving signal; and
a second mixer operable to mix the second driving signal and a second factor to generate the second weighted driving signal.

12. The phased array transmitter of claim 11,
wherein said first mixer is operable to mix the first driving signal and a first complex weighting factor to generate the first weighted driving signal, and
wherein said second mixer is operable to mix the second driving signal and a second complex weighting factor to generate the second weighted driving signal.

13. The phased array transmitter of claim 11,
wherein said first mixer is operable to mix the first driving signal and a first time delay factor to generate the first weighted driving signal, and
wherein said second mixer is operable to mix the second driving signal and a second time delay factor to generate the second weighted driving signal.

14. A method of receiving on a phased array receiver with a first received analog signal and a second analog received signal, said method comprising:
generating, via a first analog to digital converter arranged to receive the first received analog signal, a corresponding first received digital signal based on the first received analog signal;
generating, via a second analog to digital converter arranged to receive the second received analog signal, a corresponding second received digital signal;
generating, via a first down-sampler, a first down-sampled digital signal based on the first received digital signal;
generating, via a second down-sampler, a second down-sampled digital signal based on the second received digital signal;
generating, via a first polyphase low pass filter, a first filtered down-sampled received digital signal based on the first down-sampled digital signal;
generating, via a second polyphase low pass filter, a second filtered down-sampled received digital signal based on the second down-sampled digital signal; and
generating, via a beamforming core, a beamformed signal based on a combination of a first received signal and a second received signal,
wherein the first received signal is related to the first filtered down-sampled received digital signal, and
wherein the second received signal is related to the second filtered down-sampled received digital signal.

15. The method of claim 14, wherein said generating, via a beamforming core, a beamformed signal based on a combination of a first received signal and a second received signal comprises generating the beamformed signal via an adder operable to generate the beamformed signal based on a summation.

16. The method of claim 15, wherein said generating, via a beamforming core, a beamformed signal based on a combination of a first received signal and a second received signal further comprises:
mixing, via a first mixer, the first filtered down-sampled received digital signal and a first factor to generate the first received signal; and
mixing, via a second mixer, the second filtered down-sampled received digital signal and a second factor to generate the second received signal.

17. The method of claim 16,
wherein said mixing, via a first mixer, the first filtered down-sampled received digital signal and a first factor to generate the first received signal comprises mixing, via the first mixer, the first filtered down-sampled received digital signal and a first complex weighting factor to generate the first received signal, and wherein said mixing, via a second mixer, the second filtered down-sampled received digital signal and a second factor to generate the second received signal comprises mixing, via the second mixer, the second filtered down-sampled received digital signal and a second complex weighting factor to generate the second received signal.

18. The method of claim 16, wherein said mixing, via a first mixer, the first filtered down-sampled received digital signal and a first factor to generate the first received signal comprises mixing, via the first mixer, the first filtered down-sampled received digital signal and a first time delay factor to generate the first received signal, and wherein said mixing, via a second mixer, the second filtered down-sampled received digital signal and a second factor to generate the second received signal comprises mixing, via the second mixer, the second filtered down-sampled received digital signal and a second time delay factor to generate the second received signal.

19. The method of claim 14, wherein said generating, via a beamforming core, a beamformed signal based on a combination of a first received signal and a second received signal further comprises:
 mixing, via a first mixer, the first filtered down-sampled received digital signal and a first factor to generate the first received signal; and
 mixing, via a second mixer, the second filtered down-sampled received digital signal and a second factor to generate the second received signal.

20. The method of claim 19, wherein said mixing, via a first mixer, the first filtered down-sampled received digital signal and a first factor to generate the first received signal comprises mixing, via the first mixer, the first filtered down-sampled received digital signal and a first complex weighting factor to generate the first received signal, and wherein said mixing, via a second mixer, the second filtered down-sampled received digital signal and a second factor to generate the second received signal comprises mixing, via the second mixer, the second filtered down-sampled received digital signal and a second complex weighting factor to generate the second received signal.

* * * * *